United States Patent [19]
Pophusen et al.

[11] Patent Number: 5,928,739
[45] Date of Patent: Jul. 27, 1999

[54] BIAXIALLY STRETCHED, BIODEGRADABLE AND COMPOSTABLE SAUSAGE CASING

[75] Inventors: Dirk Pophusen, Walsrode; Thomas Gernot, Verden/Aller; Gunter Weber, Fallingbostel, all of Germany

[73] Assignee: Wolff Walsrode AG, Walsrode, Germany

[21] Appl. No.: 08/889,986

[22] Filed: Jul. 10, 1997

[30] Foreign Application Priority Data

Jul. 26, 1996 [DE] Germany ............... 196 30 236

[51] Int. Cl.⁶ ................................. A22C 13/00
[52] U.S. Cl. .................. 428/34.8; 428/35.2; 428/35.5; 428/910; 428/913; 138/118.1; 426/105; 426/106; 426/129
[58] Field of Search ................... 428/34.8, 35.2, 428/35.7, 474.4, 480, 35.5, 910, 913; 138/118.1; 426/105, 106, 113, 129, 135

[56] References Cited

U.S. PATENT DOCUMENTS

| | | | |
|---|---|---|---|
| 4,514,472 | 4/1985 | Vrouenraets | 428/480 |
| 4,550,025 | 10/1985 | Vrouenraets | 426/105 |
| 5,260,396 | 11/1993 | Kroner et al. | 527/201 |
| 5,314,969 | 5/1994 | Imaizumi et al. | 525/440 |
| 5,644,020 | 7/1997 | Timmerman et al. | 528/288 |

FOREIGN PATENT DOCUMENTS

| | | |
|---|---|---|
| 0 113 136 A1 | 7/1984 | European Pat. Off. . |
| 0 155 541 A2 | 9/1985 | European Pat. Off. . |
| 0 569 146 A2 | 11/1993 | European Pat. Off. . |
| 0 708 148 A1 | 4/1996 | European Pat. Off. . |
| 41 08 170 A1 | 9/1992 | Germany . |
| 42 38 770 A1 | 9/1993 | Germany . |
| 44 32 161 A1 | 3/1996 | Germany . |
| 44 38 961 A1 | 5/1996 | Germany . |
| 195 00 756 A1 | 7/1996 | Germany . |
| WO 96/07687 | 3/1996 | WIPO . |

OTHER PUBLICATIONS

Japanese Abstract of JP 08 023870, vol. 096, No. 005, May 13, 1996.

*Primary Examiner*—Rena L. Dye
*Attorney, Agent, or Firm*—Sprung Kramer Schaefer & Brisco

[57] ABSTRACT

The present invention relates to an at least single-layer, tubular, biaxially stretched, biodegradable and compostable food casing, in particular a sausage casing, at least one layer consisting substantially of a thermoplastically processable, biodegradable polymer.

9 Claims, No Drawings

BIAXIALLY STRETCHED, BIODEGRADABLE AND COMPOSTABLE SAUSAGE CASING

The present invention relates to a tubular, biaxially stretched, biodegradable and compostable food casing, in particular a sausage casing, having at least one layer, characterised in that at least one layer consists substantially of a thermoplastically processable, biodegradable and compostable polymer.

BACKGROUND OF THE INVENTION

Artificial sausage skins, also referred to as artificially produced sausage casings, are produced both from natural substances, that is, generally from renewable raw materials such as, for example, cellulose or collagen, and from synthetic materials.

When sausage casings made from synthetic material were introduced to the market about 40 years ago, the use of polyamide, polyester and polyvinylidene chloride mixed polymers prevailed. In the subsequent years—documented by various patent applications—improvements were made to these artificial casings above all with regard to the barrier properties and mechanical strengths. A distinct advantage in this respect is shown by coextruded sausage casings having properties specifically adjusted to the requirements of the respective sausage product being produced.

The production of sausage casings from renewable raw materials is possible only by expensive processes. Artificial sausage skins made of cellulose are produced predominantly by the "viscose process", which comprises the three steps of preparing the viscose, producing the artificial sausage skin from the viscose and finally the formation of the cellulose hydrate. As the cellulose has no melting point nor melting range, neither can it be processed thermoplastically. The process for producing such casings is very expensive and to some extent very damaging to the environment.

Thermoplastically processable synthetic materials afford the advantage of resource preservation, environmental protection with regard to waste water and waste air and distinctly decreased manufacturing costs.

In order that a synthetic material be biodegradable, the raw materials must already be biodegradable. Renewable raw materials fulfil this requirement naturally, but their properties are often inadequate for the subsequent application.

The sausage casings produced from purely renewable raw materials can however be composted.

On the other hand, many synthetic polymers are not, or are only extremely slowly, attacked by microorganisms. Predominantly synthetic polymers containing hetero atoms in the main chain are regarded as being potentially biodegradable. Among these materials, the polyesters represent an important class. Synthetic raw materials which contain only aliphatic monomers exhibit a relatively good biodegradability but their application is extremely limited owing to their material properties. Aromatic polyesters, in contrast, exhibit distinctly worsened biodegradability while having good material properties.

In recent times, various biodegradable polymers have become known (see DE 44 32 161). These possess the property of being readily thermoplastically processable and, on the other hand, of being biodegradable, that is, their entire polymer chain is split by microorganisms (bacteria and fungi) via enzymes and is completely decomposed into carbon dioxide, water and biomass. An appropriate test in natural surroundings under the action of microorganisms, such as occurs inter alia in a compost, is given in DIN 54 900. Owing to the thermoplastic behaviour, these biodegradable materials can be processed into semi-finished products such as cast films or blown films. Nevertheless, the use of these semi-finished products is very restricted. Firstly, these films display poor mechanical properties and secondly, the physical barrier properties with respect to water vapour and gases are very poor in comparison with films made of typical, but non-biodegradable synthetic materials such as polyethylene, polypropylene or polyamide.

The biodegradable materials known hitherto, owing to their range of properties, are unsuitable for use as food casings. A sausage casing made of thermoplastically processable starch is described in DE 4438961 A1. But these films exhibit poor mechanical properties as well as low resistance to water. In addition the mechanical properties are greatly influenced by moisture.

EP 0 569 146 A2 describes a polyester film consisting of a biodegradable polyester. The use of such a film as an artificial food casing is not described and neither is it obvious. EP 0 708 148 A1 likewise describes moulding compositions based on degradable aliphatic polyesters and suitable for blown films. Use as an artificial food casing is not described here either, because of the set of requirements which is not met by these materials.

The requirements placed on a sausage casing are very varied, depending on the field of application (type of sausage) and the sausage production technology used. The requirements for the following important applications are given here by way of example.

The requirements for a peeling skin arise mainly out of the industrial application and the high degree of automation associated therewith in the production of the sausages. The sausage casings, which are in principle always tightened up (110 to 150 feet tightened length), are closed on one side and the self-supporting tightened rope is pushed mechanically, without a network, onto the filling tube. The portioning (adjustment of filling weight) is carried out over the length of the sausage, that is, by cutters anchored in chains, so that a very high constancy of diameter is required. The filled sausages are subsequently introduced into a smoking chamber (temperature less than 75° C.; time, depending on diameter, less than 1 hour). During the hot smoking, a skin forms as a result of protein coagulation. After the product has become red all round, it is then cooled. Afterwards, generally on the next day, the skin is automatically removed; this means that only very little adhesion of the skin to the sausage meat is required (easy peel behaviour). For these applications a diameter range of 14 to 32 mm is usual.

Raw sausages are produced from coarse to medium-fine minced beef, pork, bacon, pickling solution and spices, without the addition of water. After the sausage casings have been filled with the sausage meat mixture, which has been cooled to about −4° C. and is therefore very solid, the sausages are sweated for 1 to 2 days at about 18° C. to 25° C. and at 98% relative humidity, in the course of which the characteristic red meat colour develops as a result of reddening all round. The sausages are then lightly smoked at 18° C. to 20° C. for about 3 days and subsequently matured at a maximum temperature of 18° C. for several weeks in maturing rooms, with a slight movement of air. In the course of this, they lose between 25% and 45% of their weight in water. An essential prerequisite of a raw sausage casing is a high water-vapour transmission, in order that during the maturation water can diffuse out of the sausage through the casing and there evaporate at the surface. Added to this are the requirements for a high impermeability to grease and a high resistance to shrinkage with adequate strength and elasticity. These properties result primarily from the shrinkage in volume associated with the loss of water during the maturation phase, which the casing should adjust to in equal measure by corresponding shrinkage.

With the exception of sausage casings made of collagen, which are very suitable owing to the affinity of the material to the skin, it has hitherto been a problem to combine the above-mentioned properties in sausage casings made of synthetic material for use in the production of raw sausage. Besides the sausage casings made of collagen, the market has accepted sausage casings made of regenerated cellulose fibre-reinforced primarily with woven or knitted textile fibres impregnated with collagen and/or gelatine and, to a lesser extent, stitched sausage casings made of cotton fabric.

SUMMARY OF THE INVENTION

Accordingly, the object which presented itself was to find a food casing, in particular a sausage casing, which, in addition to meeting the above-mentioned requirements, combines the advantages of the known casings and is moreover thermoplastically processable, biodegradable and compostable.

By the terms "biodegradable and compostable polymers or films" are meant, within the scope of this invention, those classified as "completely biodegradable" in accordance with DIN 54 900 in the draft dated 1996.

In this connection, suitable thermoplastically processable biodegradable polymers are aliphatic or partly aromatic polyesters, thermoplastic aliphatic polyester urethanes, aliphatic-aromatic polyester carbonates and, in particular, aliphatic polyester amides. According to the invention, the above object was successfully fulfilled by the use of a tubular, biaxially stretched, biodegradable and compostable food casing, in particular a sausage casing, having at least one layer, which is characterised in that at least one layer consists substantially of a thermoplastically processable, biodegradable polymer.

Through the use of such a food casing the problem of resource preservation, which is becoming of ever increasing importance, can be solved without disadvantages in connection with the application of the product.

Surprisingly, it has been found that a film consisting of such a biodegradable polymer is very suitable for use as an artificial food casing and, for such a sausage casing in particular, satisfies the requirements on all points.

It came as a surprise to the inventor that these biodegradable polymers, in addition to being thermoplastically processable, can also be biaxially oriented and that, as a result of this orientation process, the physical properties of the film can be distinctly improved. The latter include a distinct increase in the strength, an improvement in the optical properties and an increased barrier action by the film.

DETAILED DESCRIPTION OF THE INVENTION

Suitable polymers are listed below.

Aliphatic and partly aromatic polyesters

A) of linear bifunctional alcohols, for example, ethylene glycol, hexanediol or preferably butanediol, and/or optionally cycloaliphatic bifunctional alcohols, for example, cyclohexanedimethanol, and in addition optionally small quantities of higher-functional alcohols, for example, 1,2,3-propanetriol or neopentyl glycol, and of linear bifunctional acids, for example, succinic acid or adipic acid, and/or optionally cycloaliphatic bifunctional acids, for example, cyclohexanedicarboxylic acid, and/or optionally aromatic bifunctional acids, for example, terephthalic acid or isophthalic acid or naphthalenedicarboxylic acid, and in addition optionally small quantities of higher-functional acids, for example, trimellitic acid, or B) consisting of acid-functionalised and alcohol-functionalised structural units, for example, hydroxybutyric acid or hydroxyvaleric acid, or derivatives thereof, for example ε-caprolactone, or a mixture or a copolymer of A) and B), the aromatic acids constituting a proportion of not more than 50 wt. %, referred to all acids.

The acids may also be used in the form of derivatives, for example, acid chlorides or esters.

Aliphatic polyester urethanes composed of

C) an ester component consisting of linear bifunctional alcohols, for example, ethylene, glycol, butanediol, hexanediol, preferably butanediol, and/or optionally cycloaliphatic bifunctional alcohols, for example, cyclohexanedimethanol, and in addition optionally small quantities of higher-functional alcohols, for example, 1,2,3-propanetriol or neopentyl glycol, and of linear bifunctional acids, for example, succinic acid or adipic acid, and/or optionally cycloaliphatic and/or aromatic bifunctional acids, for example, cyclohexanedicarboxylic acid and terephthalic acid, and in addition optionally small quantities of higher-functional acids, for example, trimellitic acid, or D) an ester component consisting of acid-functionalised and alcohol-functionalised structural units, for example, hydroxybutyric acid or hydroxyvaleric acid, or derivatives thereof, for example ε-caprolactone, or a mixture or a copolymer of C) and D) and E) the reaction product of C) and/or D) with aliphatic and/or cycloaliphatic bifunctional isocyanates and in addition optionally higher-functional isocyanates, for example, tetramethylene diisocyanate, hexamethylene diisocyanate, isophorone diisocyanate, and optionally in addition with linear and/or cycloaliphatic bifunctional and/or higher-functional alcohols, for example, ethylene glycol, butanediol, hexanediol, neopentyl glycol, cyclohexanedimethanol, the ester component C) and/or D) amounting to at least 70 wt. %, referred to the sum of C), D) and E).

Aliphatic-aromatic polyester carbonates composed of

F) an ester component consisting of linear bifunctional alcohols, for example, ethylene, glycol, butanediol, hexanediol, preferably butanediol, and/or cycloaliphatic bifunctional alcohols, for example, cyclohexanedimethanol, and in addition optionally small quantities of higher-functional alcohols, for example, 1,2,3-propanetriol or neopentyl glycol, and of linear bifunctional acids, for example, succinic acid or adipic acid, and/or optionally cycloaliphatic bifunctional acids, for example, cyclohexanedicarboxylic acid, and in addition optionally small quantities of higher-functional acids, for example, trimellitic acid, or G) an ester component consisting of acid-functionalised and alcohol-functionalised structural units, for example, hydroxybutyric acid or hydroxyvaleric acid, or derivatives thereof, for example ε-caprolactone, or a mixture or a copolymer of F) and G) and H) a carbonate component, which is prepared from aromatic bifunctional phenols, for example, bisphenol A and from carbonate donors, for example, phosgene, the ester component F) and/or G) amounting to at least 70 wt. %, referred to the sum of F), G) and H).

Aliphatic polyester amides composed of

I) an ester component consisting of linear and/or cycloaliphatic bifunctional alcohols, for example, ethylene glycol, hexanediol or butanediol, preferably butanediol or cyclohexanedimethanol, and in addition optionally small quantities of higher-functional alcohols, for example, 1,2,3-propanetriol or neopentyl glycol, and of linear and/or cycloaliphatic bifunctional acids, for example, succinic acid, adipic acid, cyclohexanedicarboxylic acid, preferably adipic acid, and in addition optionally small quantities of higher-functional acids, for example, trimellitic acid, or K) an ester component consisting of acid-functionalised and alcohol-functionalised structural units, for example, hydroxybutyric acid or hydroxyvaleric acid, or derivatives thereof, for example ε-caprolactone,
or a mixture or a copolymer of I) and K) and L) an amide component consisting of linear and/or cycloaliphatic bifunctional and, in addition, optionally small quantities of higher-functional amines, for example, tetramethylenediamine, hexamethylenediamine, isophoronediamine, and also of linear and/or cycloaliphatic bifunctional acids and in addition optionally small quantities of higher-functional acids, for example, succinic acid or adipic acid, or M) an amide component consisting of acid-functionalised and alcohol-functionalised structural units, preferably ω-lauryl lactam and particularly preferably ε-caprolactam, or a mixture of L) and M) as amide component,
the ester component I) and/or K) amounting to at least 30 wt. %, referred to the sum of I), K), L) and M).

The biodegradable and compostable raw materials according to the invention may contain processing agents and additives such as, for example, nucleating agents (for example, 1,5-naphthalene disodium sulphonate), stabilisers or lubricants.

The invention also provides the process for the production of such a tubular, biaxially stretched, biodegradable and compostable food casing.

The tubular film according to the invention is suitably produced by an extrusion process. The raw material in granular form is melted, homogenised and compressed in an extruder and discharged through a die. The die may be an annular die for the production of a seamless tubular film. The film thus discharged or, for example, drawn out by means of roller presses, is then cooled until it solidifies. Cooling can be effected by means either of air or else water or even by means of cooling rollers. Cooling can be effected on one or on both sides and, in the case of a tubular film, inside and outside, or only inside or only outside. The so-called primary tube is subsequently tempered, tempering being carried out below the crystallite melting temperature in the case of partly crystalline materials and above the glass transition temperature in the case of amorphous materials, and is then ideally simultaneously stretched biaxially. A particularly suitable process is simultaneous biaxial stretching by means of the double-bubble technology, wherein the stretching of a primary bubble is effected by an internal pressure. Stretching is carried out with an overall degree of stretching of between 5 and 50, and in particular between 15 and 25. The overall degree of stretching is the product of the end degree of transverse stretching and the end degree of longitudinal stretching. Transverse stretching is effected by the difference in pressure between the internal pressure and the external ambient pressure and longitudinal stretching is additionally also effected by a difference in the speed of the roller presses acting on the film. The film can then be subjected to a heat treatment to achieve selective adjustment of the shrinkage properties. In this fixing process, the film can be heated up again to just below the crystallite melting temperature.

To improve the adhesion of the sausage meat, the surface of the film can be pretreated, later or directly in-line, on the side later to be adjacent to the sausage meat. Likewise, an external surface treatment can be carried out, for example, to improve the printability. The pretreatments can be carried out by means of corona, a flame, a plasma or an oxidising substance or mixture of substances, so that there is a resulting increase of ≧30 mN/m in the surface tension on the flat surfaces of the films.

The food casings may be impregnated or coated on the inside, the outside or both.

The relevant properties of the food casings described below are determined by the following procedures.

The "biodegradability" of thermoplastic synthetic materials and film products, that is, the compostability, can be detected by the Controlled Composting Test (CCT). For such a test, the material is mixed with compost and stored in a tempered laboratory composter. The evolution of $CO_2$, the biomass developing and the quantity of non-degraded polymer are monitored during the rotting process. In the analysis of the residual polymer, it was found that no traces of synthetic material nor decomposition products remained in the compost. The compostability was determined in accordance with the testing specifications of the draft Standard DIN 54 900, Part 3, dated 1996. On the basis of the experimental results, the samples of film are classified into the appropriate classes in accordance with the instructions given in the DIN.

The permeation values of water vapour and of oxygen are standardised in accordance with DIN 53 122 and determined in accordance with DIN 53 380.

The mechanical characteristic values, such as modulus of elasticity, tear resistance and elongation at tear, are found from standard tensile tests in accordance with DIN 53 457 and DIN 53 455.

The shrinkage properties were determined in accordance with DIN 53 377.

The practical tests for industrial application were carried out in an experimental butcher's shop. To test suitability for industrial application, the relevant properties of different casings were assessed by means of a system of marks, the best result being denoted by the mark 1 and the worst result by the mark 6. The criteria applied are the filling behaviour, the constancy of diameter, the freedom from creases and the removability of the skin.

The subject matter of the invention is further explained by means of the Examples below.

EXAMPLES

The three Examples shown in the following Table were carried out using biaxially stretched tubular films, diameter 60 mm, which were produced by the process described in further detail above. A biodegradable polyester amide was used, which had a melting viscosity of 250 Pa.s at 190° C. (measured in accordance with DIN 54 811-B) and a melting point of 125° C. measured in accordance with ISO 3146/C2.

In addition an annular nozzle was used for the production of a primary tube. The latter was tempered at about 10° C. in a water bath and subsequently heated by means of hot air to a stretching temperature suitable for the biaxial stretching. The biaxial stretching was carried out by the injection of compressed air.

The wound tubular films are then formed into continuous tightened tubes of about 25 to 30 m in length, using standard tightening machines.

The casings produced in the above-mentioned Examples were examined for industrial application by means of a practical test. The sausages produced matured perfectly and could be peeled easily.

The processing conditions for the production and the assessment of the industrial application are summarised in the following Table.

| Example | | 1 | 2 | 3 |
|---|---|---|---|---|
| Class of raw material | | Polyester amide | Polyester amide | Polyester amide |
| Description of type | | BAK 1095 | BAK 1095 | BAK 1095 |
| Manufacturer | | Bayer AG | Bayer AG | Bayer AG |
| Diameter of primary tube | mm | 20 | 12 | 13 |
| Degree of transverse stretching | — | 3 | 5 | 4.5 |
| Degree of longitudinal stretching | — | 4.5 | 3.75 | 4.5 |
| Degree of surface stretching | — | 14 | 19 | 20 |
| Stretching bubble diameter | mm | 60 | 60 | 58.5 |
| Width of tubular film | mm | 38 | 38 | 37 |
| Overall thickness | μm | 40 | 51 | 38 |
| Filling behaviour | (1–6) | 1 | 1 | 1 |
| Filled diameter | mm | 64 | 63 | 65 |
| Constancy of diameter | (1–6) | 2 | 1 | 3 |
| Freedom from creases/shrinkage behaviour | (1–6) | 1 | 1 | 2 |
| Removability of skin | (1–6) | 2 | 1 | 1 |
| Biodegradability CCT; Compostability (DIN 54 900) | — | is given | is given | is given |
| Modulus of elasticity longitudinal/transverse | MPa | 292/260 | 226/292 | 250/260 |
| Tear resistance longitudinal/transverse | MPa | 109/105 | 90/109 | 100/105 |
| Elongation at tear longitudinal/transverse | % | 111/165 | 224/111 | 170/165 |
| Shrinkage at 100° C. transverse/longitudinal | % | 20/25 | 30/25 | 27/27 |
| Oxygen permeation 23° C. 0% rel. humidity | cm³/m²d /bar | not measured | 384 | not measured |
| Water vapour permeation 23° C. 0% rel. humidity | g/m²d | not measured | 200 | not measured |

We claim:

1. Tubular, biaxially stretched, biodegradable and compostable food casing, having at least one layer, wherein said at least one layer consists essentially of an extrusion processable, biodegradable polymer which includes a member of the group consisting of aliphatic polyesters partly aromatic polyesters, and aliphatic-aromatic polyester carbonates.

2. A food casing according to claim 1, wherein the polymeric materials used in the production of the food casing are converted into the melted state, discharged through a nozzle and then cooled until they have solidified and subsequently stretched biaxially.

3. A food casing according to claim 1, wherein the biaxially stretched food casing is produced from biodegradable polymer having a degree of surface stretching of between 5 and 50, in particular 15 to 25.

4. A food casing according to claim 1, wherein the food casing is coextruded as multiple layers.

5. A food casing according to claim 1, wherein the biodegradable and compostable, extrusion processable polymers are blended with other polymers.

6. A food casing according to claim 1, wherein the food casing contains organic or inorganic additives.

7. A food casing according to claim 1, wherein said food casing is further processed into a form selected from the group consisting of continuous tightened tubes, sections, and sausage rings.

8. A food casing according to claim 1, wherein the food casing is impregnated or coated on the inside and/or outside.

9. Tubular, biaxially stretched, biodegradable and compostable food casing, having at least one layer, wherein said at least one layer consists essentially of an extrusion processable, biodegradable aliphatic polyesteramide and optionally processing agents and additives.

* * * * *